United States Patent
De Koning et al.

(10) Patent No.: US 6,807,898 B2
(45) Date of Patent: Oct. 26, 2004

(54) DRIVE FOR A COFFEE-MAKING DEVICE

(75) Inventors: Abraham Gijsbert De Koning, Waarder (NL); Jan Cornelis Van Hattem, Amerongen (NL)

(73) Assignee: J.M de Jong Duke Automatenfabriek B.V., Sliedrecht (NL)

( * ) Notice: Subject to any disclaimer, the term of this patent is extended or adjusted under 35 U.S.C. 154(b) by 0 days.

(21) Appl. No.: 10/239,795

(22) PCT Filed: Apr. 2, 2001

(86) PCT No.: PCT/NL01/00271
§ 371 (c)(1),
(2), (4) Date: Dec. 2, 2002

(87) PCT Pub. No.: WO01/74213
PCT Pub. Date: Oct. 11, 2001

(65) Prior Publication Data
US 2003/0147997 A1 Aug. 7, 2003

(30) Foreign Application Priority Data
Mar. 31, 2000 (NL) .............................. 1014817

(51) Int. Cl.⁷ ............................................... A47J 31/00
(52) U.S. Cl. .................. 99/289 R; 99/302 P; 99/289 D
(58) Field of Search .......................... 99/302 P, 289 D, 99/302 R, 289 R

(56) References Cited

U.S. PATENT DOCUMENTS

| 4,579,049 A | * | 4/1986 | Rodrigues | ................ 99/289 R |
| 5,622,099 A | | 4/1997 | Frei | |
| 6,101,923 A | * | 8/2000 | Karg et al. | ................ 99/289 D |

FOREIGN PATENT DOCUMENTS

| DE | 9647385 | 8/1998 |
| EP | 0380450 | 8/1990 |

* cited by examiner

Primary Examiner—Reginald L. Alexander
(74) Attorney, Agent, or Firm—Kirkpatrick & Lockhart LLP; Anthony H. Handal

(57) ABSTRACT

Coffee-making device with a piston/cylinder unit, the piston (3) being driven by a drive mechanism. A swivelling arm structure is also driven by means of said drive mechanism (10,11), with the interposition of a cam/cam follower mechanism. The swivelling arm structure is provided with a cover (39) for closing off the free end of the cylinder (2). The cover can be pressed onto the cylinder by means of a cam structure.

16 Claims, 5 Drawing Sheets

DRIVE FOR A COFFEE-MAKING DEVICE

BACKGROUND OF THE INVENTION

The present invention relates to a coffee-making device, comprising a housing with a cylinder in which a piston is provided, for compressing with the piston coffee placed on said piston, said piston being movable by means of a drive mechanism, and said drive mechanism being provided in said housing, and comprising a cover that can be placed on said cylinder, in order to bound a compression chamber with said cylinder and piston, means for introducing water into the compression chamber, means for discharging brewed coffee from the compression chamber, and means for removing the compressed coffee tablet, said movable cover comprising a swivelling arm structure, which is rotatable substantially about and over said cylinder in such a way that said cover can be moved above and away from the end of the cylinder, in order to bring said cover into engagement in a sealing manner with said cylinder end, said drive mechanism being designed to operate both said piston and said swivelling arm, and comprising a rotary input shaft.

Such a coffee-making device is known from European Patent Application 1005821, which was published after the priority date of the present application. The European application discloses a first embodiment of a coffee-making machine which operates without piston and a second embodiment with piston, the piston being made reciprocating by a gearwheel provided with screw thread. This means that a separate device for generating fluid pressure must be present, with the result that the device becomes complicated and takes up a large amount of space.

Such a design means that with uniform rotation of the drive motor the piston will carry out a uniform motion.

In the prior art coffee-making devices in which the motion of the piston is carried out by means of a crankshaft-cum-piston/cylinder structure are known, in the case of which devices the coffee is placed on the piston and, after the coffee has been compressed, water is forced through the coffee. An example of such a structure is found in U.S. Pat. No. 5,638,739. After the coffee has been consumed, the pressed coffee tablet is driven out of the cylinder and removed. This is carried out in U.S. Pat. No. 5,638,739 by means of a swivelling arm structure which by means of a complicated gearwheel system runs synchronously with the motion of the crankshaft and piston. By means of this swivelling arm structure, the coffee tablet is swept off the top side of the cylinder.

A complicated mechanism comprising a further slidable cylinder is used to close off the top side of the cylinder.

A coffee-making device operating with a piston is known from U.S. Pat. No. 5,622,099A. The piston is moved up and down by means of an operating lever fitted on the top side of the coffee-making device. Such a device is not suitable for use in automatically operating coffee-making devices.

EP0380450A discloses a structure in which the cylinder is not immovable connected to the housing, but can be tilted around it, and in which the piston is moved in a certain tilted position.

SUMMARY OF THE INVENTION

It is the object of the present invention to simplify a coffee-making device of the type described above considerably by substantially reducing the number of components used for it.

This object is achieved in a coffee-making device of the type described above in that said drive mechanism for said piston is provided with means for converting a uniform rotating motion into a non-uniform reciprocating motion.

The closing and opening characteristic of the piston in the cylinder unit can be influenced, in other words optimized, by converting the uniform rotating motion of the drive motor into a non-uniform motion.

Such a non-linear motion characteristic of the piston can be obtained in any way known in the prior art. An example that can be mentioned is a curved disc which is driven by the rotary motor and in turn drives the piston. A certain opening and closing characteristic of the piston can be obtained through the special shape of the curve.

Another possibility is to use a crankshaft structure.

In this way a particularly compact structure can be obtained with a single drive motor. More particularly, the actual coffee-making process can be carried out irrespective of the coffee material, or the quantity of coffee material can be varied, without special measures as regards structure being necessary. A particularly simple structure can be obtained by using a swivelling arm structure for moving the cover on the cylinder. Owing to the fact that the swiveling arm rotates substantially about the axis of the crankshaft, a particularly compact device is obtained.

Such a swivelling arm structure can be driven in any way known in the prior art. However, it is preferably driven by the crankshaft. If the structure is designed in a suitable manner, it is possible for it to be driven directly by the crankshaft, in other words without interposing gearwheels and other transmission mechanisms.

The reciprocating motion of the rocker arm in order to place the cover on the free end of the cylinder in a sealing manner can also be carried out in any way known in the prior art. It is, however, preferably carried out by means of a cam/cam follower mechanism. Said cam/cam follower mechanism is preferably likewise fitted on the crankshaft of the piston. By this measure also, further simplification of the coffee-making device according to the invention can be obtained. The coffee-making device can consequently be manufactured more cheaply, and fewer components will wear, and any parts that may have worn will be easier to replace. Cleaning can also be carried out in a simple manner.

The structure described above works in particular if the crankshaft rotates in different directions, in other words if it does not rotate in only one direction during a coffee-making operation. In particular, if a combination with cams/cam followers is envisaged for driving the swivelling arm structure, such a motion in different directions is advantageous. Of course, a corresponding, suitable control is present.

Certain parts of the motion process of the swivelling arm structure can be controlled by means of a spring or the like.

According to an advantageous embodiment of the invention, a valve with variable restriction is present in the outlet for the brewed coffee. The valve structure is designed in such a way that at relatively low pressure a relatively large passage is present. If the pressure increases, the passage will become smaller.

In this way it is possible, without further mechanical components and/or controls, to build up a higher back pressure in the coffee depending on the pressure of the water moving through the coffee. In this way, the back pressure of the water in the coffee can be determined, controlled purely by the inlet pressure of the water in the coffee. This makes it simple to make "ordinary" coffee or espresso coffee, or variants of these.

It will be understood that the valve structure just described can likewise be used in combination with other coffee-making devices known from the prior art. The fact is that this valve structure is fully independent of the remainder of the coffee-making devices. Of course, it is the case that the already simple structure of the coffee-making device is further simplified by using such a valve.

BRIEF DESCRIPTION OF THE DRAWINGS

Further special features and details of the invention emerge from the appended drawings, in which.

DETAILED DESCRIPTION OF EMBODIMENTS OF THE INVENTION

Figure 1A:
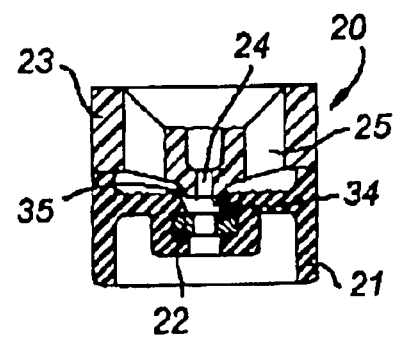
FIG. 1 shows in cross section the most essential components of the coffee-making device according to the invention.
Figure 1:
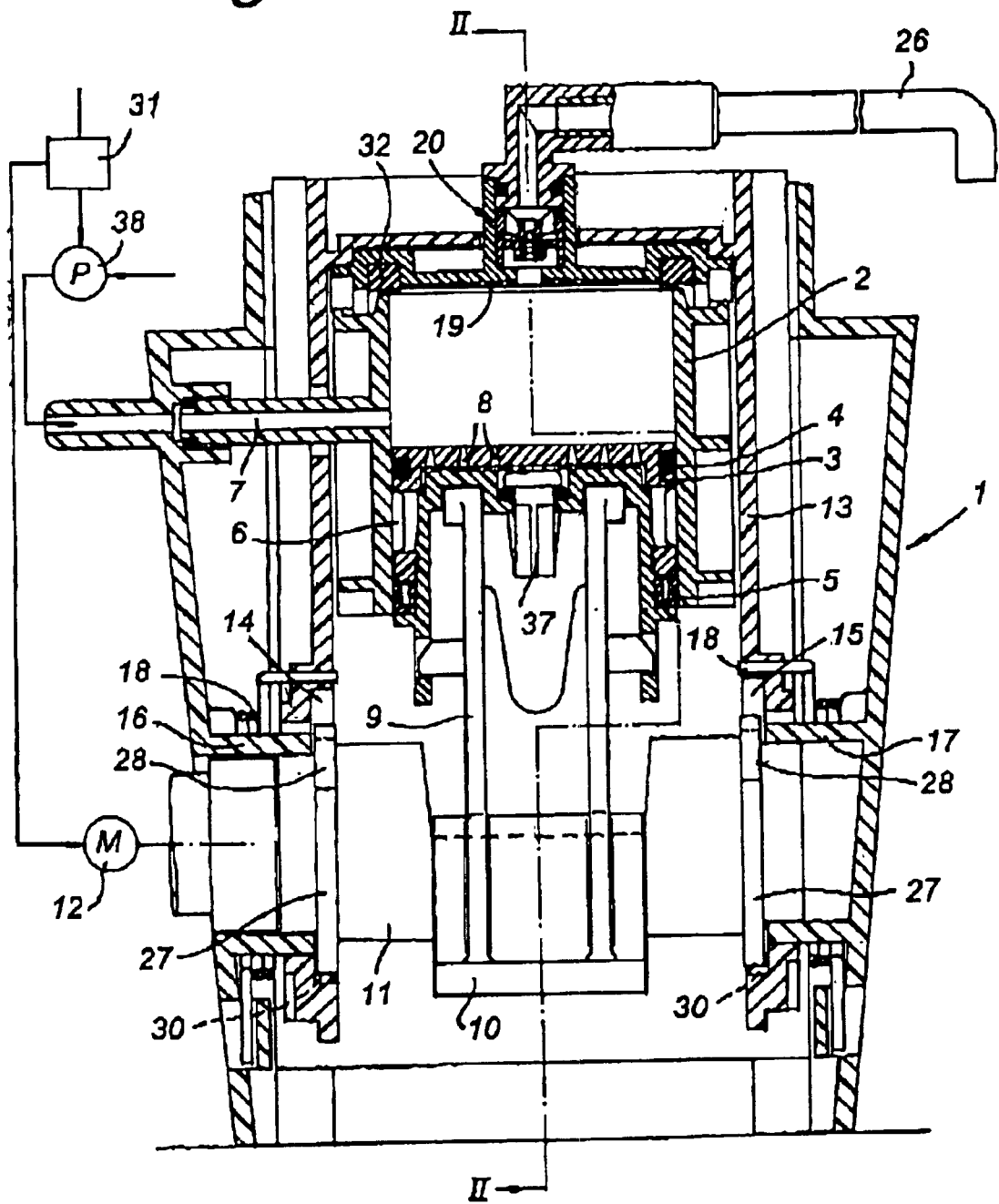
Figure 2:
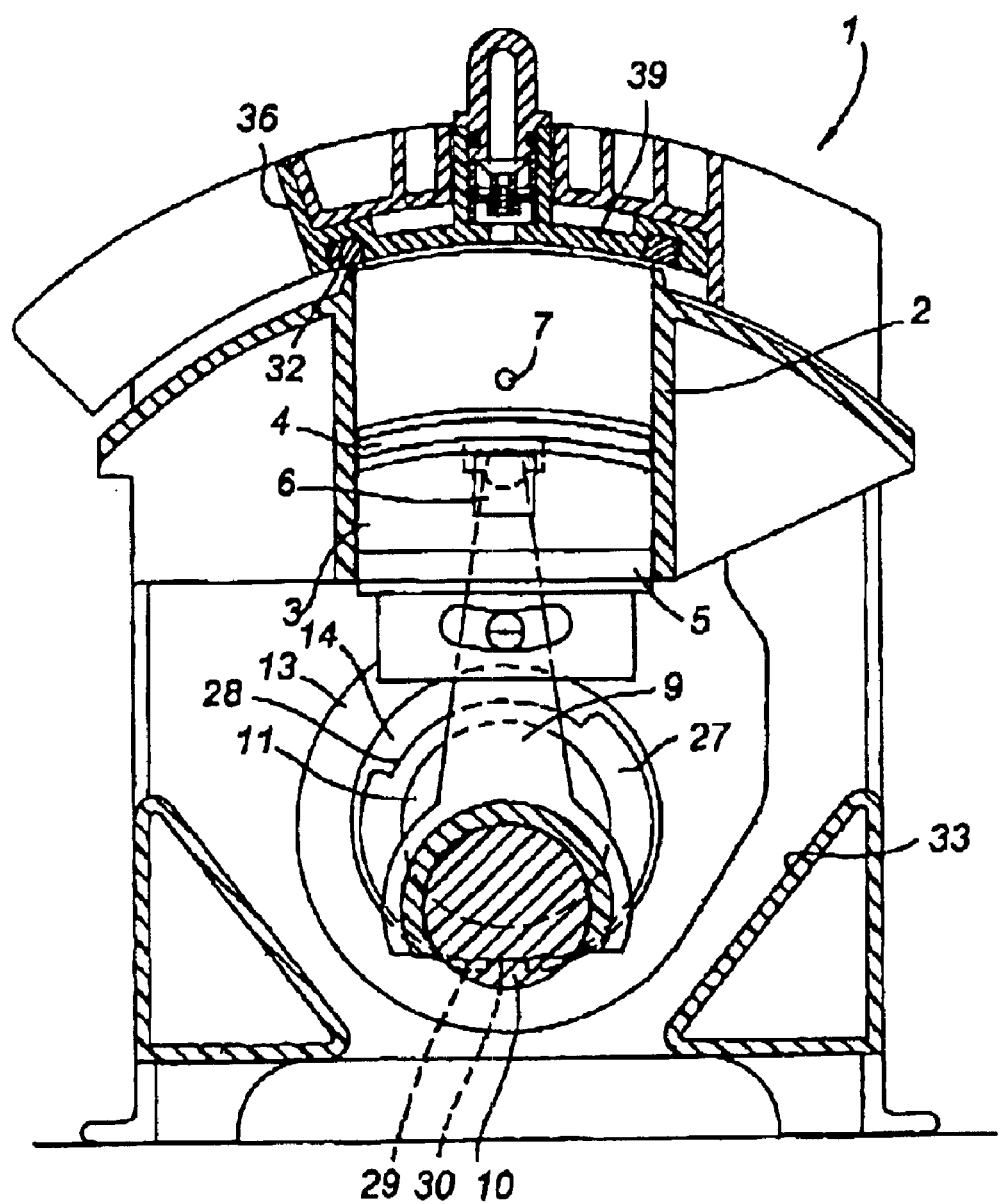
FIG. 2 shows a cross section in accordance with the line II in FIG. 1.

Only the part of a coffee-making device according to the invention that is essential for the invention is illustrated in the drawings. More particularly, only the part by means of which the coffee is compressed and where water is conveyed through the coffee is illustrated.

The device according to the invention can be used for making both espresso coffee and other types of coffee. However, it should be understood that the device can also be designed for preparing only one type of coffee.

The device according to the invention is indicated in its entirety by 1 in the figures. The device is composed of a housing (not shown in any further detail), part of which is formed by a cylinder 2. A piston 3 can move up and down inside the cylinder. Piston 3 is provided with a double seal. The top seal is indicated by 4, and the bottom seal is indicated by 5. A number of windows 6 are bounded by the two seals. These windows 6 can be brought into communication with a supply line 7 for warm, pressurized water. This water is provided by way of a diagrammatically illustrated pump 38. Windows 6 are in communication with dispensing apertures 8. The piston 3 is connected by way of piston rod 9 to a crank pin 10, which in turn forms part of a crankshaft 11, which is connected to a motor 12, illustrated only diagrammatically. A vent valve 33, which works in such a way that no vacuum can arise in the confined space above piston 3, is present in the piston 3. In other words, only overpressure can be produced by piston 3.

A rocker arm 13, provided with control apertures 14 and 15, is present. It can be seen from the drawing that the edge of the apertures 14, 15 engages on curved discs 27, to be described further. The rocker arm 13 is driven in the upward direction (in the drawing) by means of two coil springs 18. Rocker arm 13 is provided with a cover 39 in which a filter plate 19, provided with a filter 20, is fitted.

Filter plate 19 is provided with a sealing ring 32, which interacts with the free top end of the cylinder 2. A valve 20 is also fitted in filter plate 19. Valve 20 (FIG. 1a) is composed of an elastic bottom part 21, which can be made of, for example, a rubber-like material, and is provided with a restriction disc 22 with a diameter of, for example, 1.0 mm.

The top part of valve 20 is indicated by 23 and is composed of a relatively rigid material. An auxiliary restriction 24 and also a bypass channel 25 are present in this top part. The valve is connected to outlet 26 for the coffee, which in a manner not illustrated any further is connected to a pipe system, or in another way provides for the coffee to pass into the cup or other storage container. The bottom part 21 in this case is provided with a cone 34, and the top part is provided with a cone 35. When there is deformation of the bottom part 21, cones 34 and 35 engage each other.

A curved disc 27, already mentioned above, is fitted on the crankshaft 11. The curved disc is provided with recesses 28 and 29. The rocker arm 13 is provided with a cam 30 in control apertures 14 and 15, designed to engage with the curved disc 27 or its recesses.

A control indicated diagrammatically by 31 is present.

The device described above works as follows:

During a first phase of the coffee-making process (FIG. 3) the rocker arm is situated in such a position that the aperture of cylinder 2 is clear.

In this position coffee 40 is placed in a manner not illustrated in any greater detail on the piston 3. The quantity of coffee can be dependent, for example, on the desired product: a small quantity for "ordinary" coffee, and a larger quantity for espresso coffee.

Figure 3:
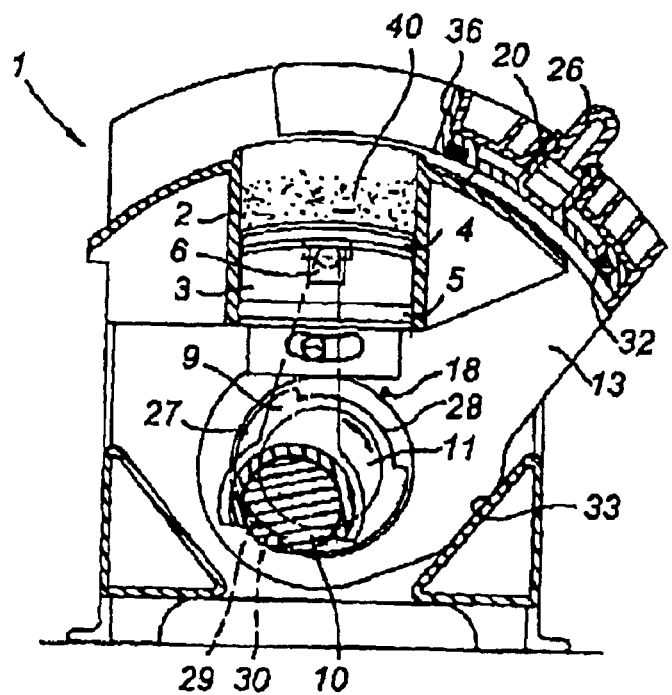
FIGS. 3–6 show the structure shown in FIG. 2 during various stages of the coffee-making process.

As can be seen from FIG. 3, the rocker arm 13 rests against stop 33 of the housing in which the device 1 according to the invention is accommodated. Cam 30 is situated in recess 29 and, through the action of coil springs 18, the rocker arm 13 is pressed upwards in the figures. Apart from producing a spring pressure in the upward direction, the coil springs 18 also serve to generate a force to the left in the figures, in other words they try to move the rocker arm 13 into the position above the cylinder 2.

Starting from the position shown in FIG. 3, the motor 12 turns the crankshaft 11 to the left in the view shown. During this motion the piston 3 moves downwards, and at the same time the rocker arm 13 is moved along with it to the left until the latter hits a stop 36 in a manner not shown in any further detail.

Figure 4:
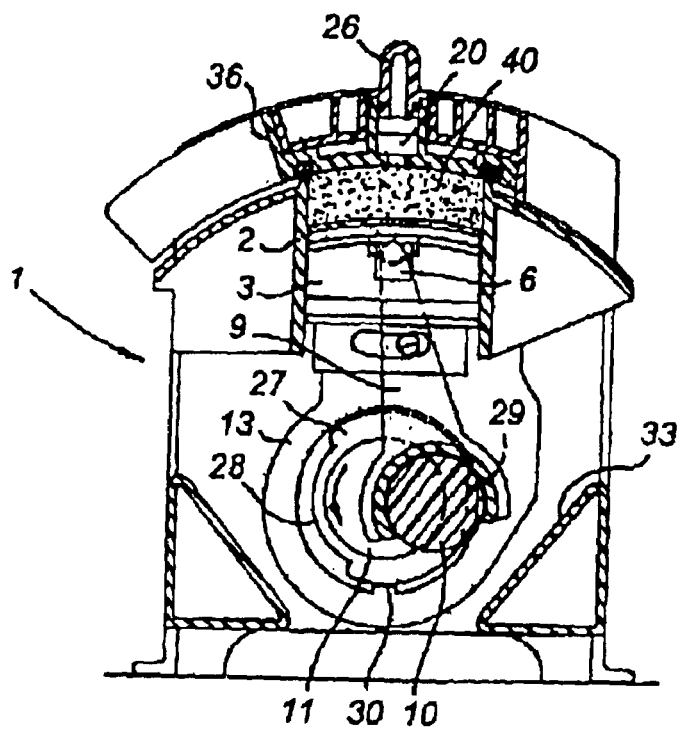

On further rotation of crankshaft 11 in the direction of the arrow shown in FIGS. 3 and 4, rocker arm 13 is pulled downwards. The fact is that further motion to the left is impossible, on account of the stop 36, so that on reaching the end of the recess 29 the cam 30 is pressed downwards by the curved disc, against the spring force of springs 18. As a result, the seal 32 of filter plate 19 engages the free end of cylinder 2.

Piston 3, driven by motor 12, which is still turning to the left, then moves upwards again, so that coffee 40 is compressed.

Depending on the quantity of coffee, the piston will be situated at a higher or lower level. The "height" of chamber 6 is, however, such that in this position the chamber 6 will always be in communication with the supply line 7. By means of control 31, compression of the coffee 40 is established. In other words, if, for example, the quantity of current supplied to motor 12 exceed a certain value, it is established that sufficient compression is present and the motor is switched off, or less current is supplied to it, so that no further compression or less compression occurs.

Water is then supplied through line 7. This water is preferably heated water. Depending on the product that has to be prepared, the pressure of the water is selected with control 31. In other words, the output of the pump 38 is controlled by the control 31 in such a way that the desired product is obtained.

For traditional coffee, a relatively low pressure will be used, while for espresso coffee the pressure worked with will be higher (for example, higher than 7 atmospheres).

In both cases the warm water fed in will pass into the coffee by way of the chamber 6 through apertures 8, and will leave the coffee again by way of the filter plate 19, during which process the coffee is, of course, retained by the filter plate. Depending on the outlet pressure, valve 20 will function. At relatively low pressure little or no deformation of the rubber bottom part 21 will occur, in other words cone 34 is not pressed against cone 35. This means that the water encounters hindrance only from restriction 22, and the pressure in the coffee will remain relatively low.

If, however, water is supplied at higher pressure, this will result in a greater deformation of the bottom part 21 of valve 20, with the result that cones 34 and 35 seal on top of each other through deformation of the bottom part 21. Apart from relatively small restriction 22, the effect of the smaller restriction 24 (for example, 0.7 mm) now comes into play.

Because of this narrower restriction, a higher pressure will be generated in the coffee, so that espresso can be prepared.

Figure 5:
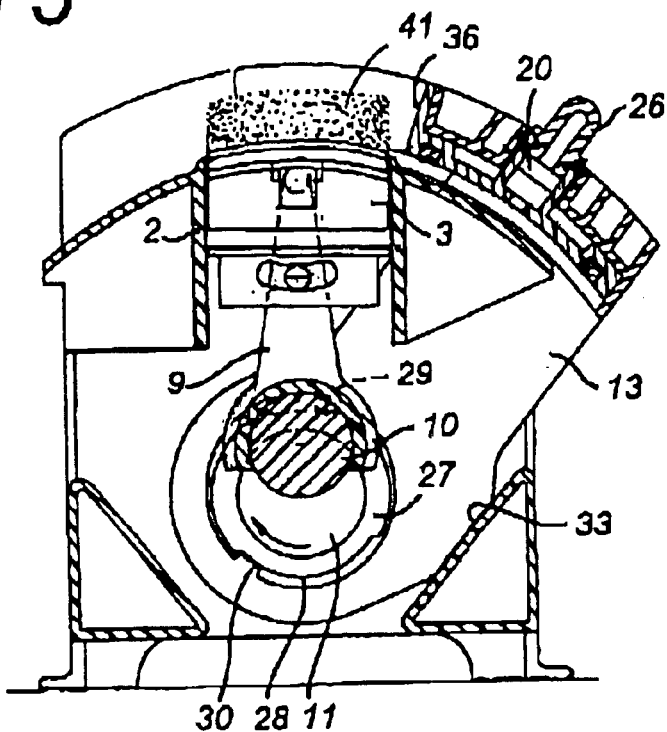
Figure 6:
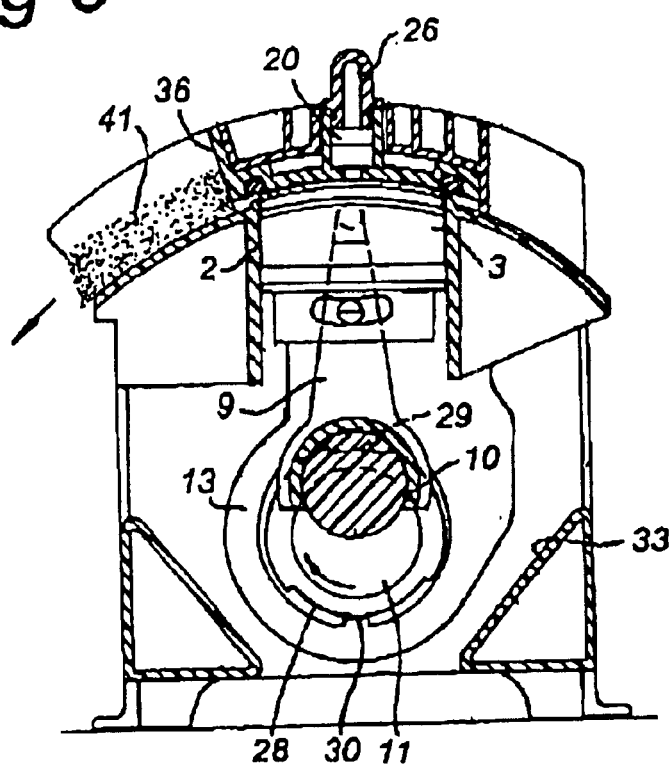

The coffee preparation process typically takes 10–35 seconds. After the water has been forced through the coffee tablet, the motor 12 is switched on again and moves in the opposite direction, as shown in FIGS. 5 and 6. This return motion occurs until cam 30 falls into recess 29. Owing to the spring force, rocker arm 13 moves upwards and there is no longer a seal between sealing edge 32 and the top end of cylinder 2. The rocker arm 13 then moves along with the crankshaft 11. The stripping motion along the coffee tablet can be carried out relatively simply. Rocker arm 13 moves to the position shown in FIG. 5 against the stop 33 of the housing. The rocker arm is then pressed downwards by the fact that crank 11 turns further and the "end" of recess 29 is reached. On further turning of the crank 11, the piston 3 now moves to its top dead centre, so that the coffee tablet 41 is moved to above the level of cylinder 2.

Cam 30 then goes into recess 28. Under the influence of coil springs 18, rocker arm 13 not only moves upwards as a result, but also shoots to the left, as shown in FIG. 6. In the process, the coffee tablet is removed to the left by scraper strip 36. On further rotation, when there is engagement with the "end" of recess 28, cam 30, and thus rocker arm 13, is turned to the right until the initial position shown in FIG. 3 is reached.

Figure 7:
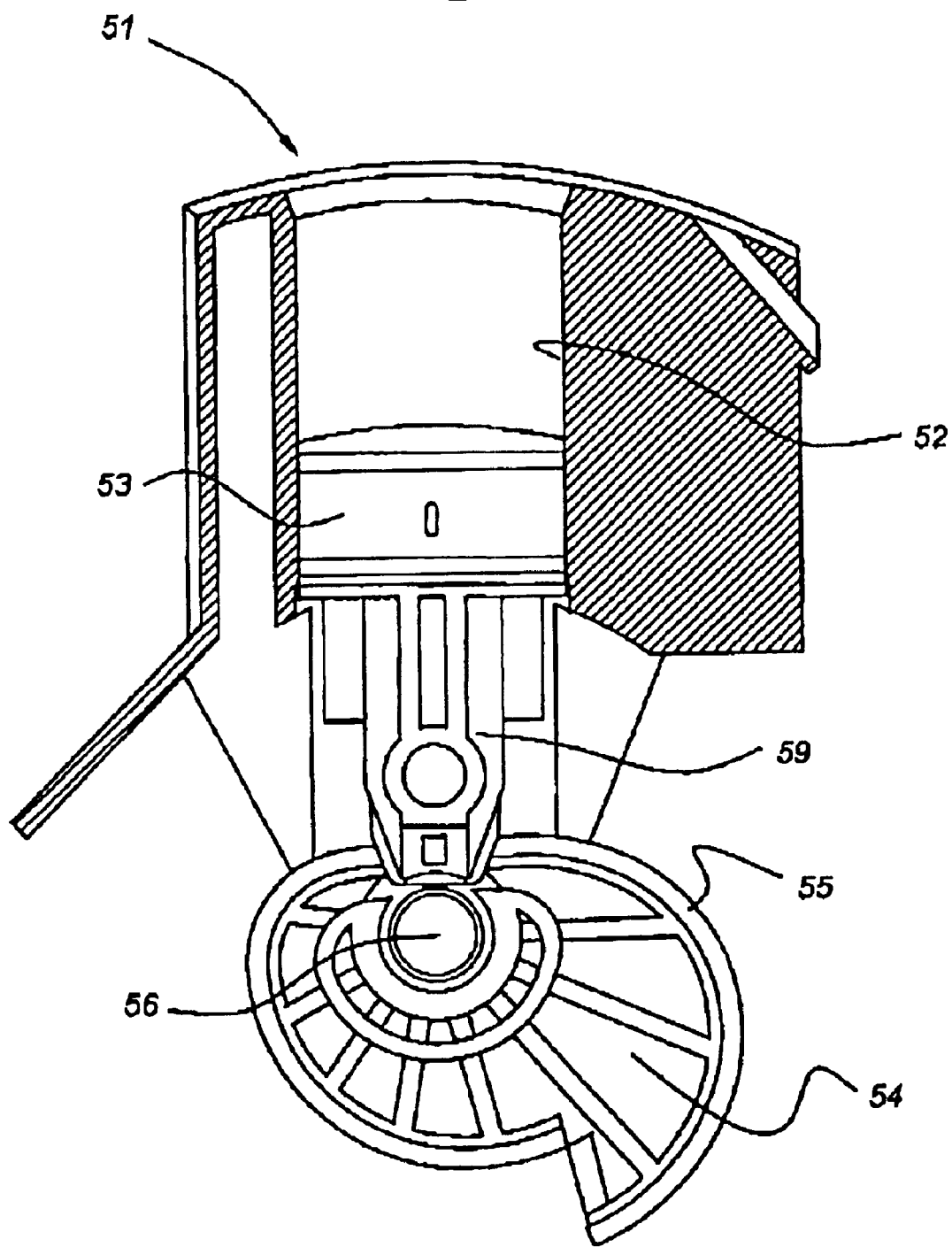
FIG. 7 shows an alternative for the drive of the piston and swivelling arm structure, as illustrated in the previous figures.

FIG. 7 shows very diagrammatically a variant of the device described above. This device is indicated in its entirety by 51 and comprises a cylinder 52 with a piston 53 provided therein. This piston is provided with a rod 59, which is rigidly connected to it and provided on the end with cams (not shown in any her detail) which run in a curved track 55 of a curved disc 54. The curved disc 54 is provided with a central shaft 56, which is driven by a central drive motor (not shown). The swivelling arm is likewise driven by this central drive motor, in the manner described above. In this case the structure with curved disc 27 and the like shown by means of the earlier figures can be used, and the latter may be integral with curved disc 54 or otherwise.

What is claimed is:

1. Coffee-making device (1, 51), comprising a housing with a cylinder (2) in which a piston (3) is provided, for compressing with the piston coffee placed on said piston, said piston being movable by means of a drive mechanism (10,11), and said drive mechanism being provided in said housing, and comprising a cover (39) that can be placed on said cylinder, in order to bound a compression chamber with said cylinder and piston, means for introducing water into the compression chamber, means for discharging brewed coffee from the compression chamber, and means for removing the compressed coffee tablet, said movable cover comprising a swivelling arm structure (13), which is rotatable substantially about and over said cylinder in such a way that said cover can be moved above and away from the end of the cylinder, in order to bring said cover into engagement in a sealing manner with said cylinder end, said drive mechanism being designed to operate both said piston and said swivelling arm and comprising a rotary input shaft, characterized in that said drive mechanism for said piston is provided with means for converting a uniform rotating motion into a non-uniform reciprocating motion.

2. Coffee-making device according to claim 1, in which said drive mechanism comprises an input shaft connected to a motor (12).

3. Coffee-making device according to claim 2, in which the swivelling arm is provided in a rotating manner, and the axis of rotation of said swivelling arm structure (3) is perpendicular to the axis of said cylinder.

4. Coffee-making device according to claim 1, in which said drive mechanism comprises a rotating curved disc and engagement means connected to the piston and engaging upon the curve of said disc.

5. Coffee-making device according to claim 1, in which said drive mechanism comprises a crankshaft, and in which said piston is connected to the driving rod of said crankshaft.

6. Coffee-making device according to claim 5, in which the axis of rotation of said swivelling arm structure (3) coincides with the axis of rotation of said crankshaft.

7. Coffee-making device according to claim 3, in which said swivelling arm structure (13) can be driven by said crankshaft.

8. Coffee-making device according to claim 1, in which a cam/cam follower mechanism is present for transmitting said reciprocating motion.

9. Coffee-making device according to claim 8, in which said cam or cam follower is fitted on said crankshaft and the other of said cam follower and said cam is fitted on said swivelling arm structure.

10. Coffee-making device according to claim 1, comprising spring means for driving said swivelling arm structure into the position above the free end of said cylinder.

11. Coffee-making device according to claim 1, in which said swivelling arm structure is provided with means (36) for discharging said coffee tablet.

12. Coffee-making device according to claim 1, in which said drive mechanism is designed to rotate in two directions.

13. Coffee-making device according to claim 1, in which said means for discharging brewed coffee from the compression chamber comprise a restriction which reacts to pressure, designed in such a way that at relatively low pressure a restriction with larger passage is present and at relatively higher pressure a restriction with smaller passage is present.

14. A coffee-making device comprising:
(a) a housing having a cylinder;
(b) a piston movable in the cylinder;
(c) a drive mechanism provided in the housing to move the piston to compress coffee placed on the piston;
(d) a movable cover cooperative with the cylinder to define a coffee compression chamber with the cylinder;
(e) a water supply to supply water to the compression chamber;

(f) an outlet for outflow of brewed coffee from the compression chamber; and (g) a removal mechanism to remove the compressed coffee tablet from the compression chamber;

wherein the movable cover is operable by the drive mechanism and comprises a swiveling arm structure rotatable to move the cover away from the cylinder to permit coffee to be placed on the piston and to move the cover into sealing engagement with the cylinder and wherein the drive mechanism has a rotary input shaft and operates to convert uniform rotary input motion into a reciprocating output motion.

15. A coffee-making device according to claim 14 wherein the swiveling arm structure is rotatable substantially about the cylinder and over the cylinder so that the movable cover can be moved above and away from the end of the cylinder.

16. A coffee-making device according to claim 14 wherein the cylinder is a part of the housing, wherein the drive mechanism comprises a crankshaft having a driving rod, the piston being connected to the driving rod and wherein the drive mechanism comprises a rotating curved disc and a cam follower engaging upon the curve of the disc to transmit motion from the crankshaft to the swivelling arm structure.

\* \* \* \* \*